(12) United States Patent
Frash et al.

(10) Patent No.: US 10,633,187 B2
(45) Date of Patent: Apr. 28, 2020

(54) RADIUS AND VARIABLE WIDTH CONVEYOR BELT

(71) Applicant: Rabbit Designs LLC, Newburyport, MA (US)

(72) Inventors: Scott Elliott Frash, Georgetown, MA (US); Jean Shannon Frash, Newburyport, MA (US)

(73) Assignee: Rabbit Designs LLC, Newburyport, MA (US)

( * ) Notice: Subject to any disclaimer, the term of this patent is extended or adjusted under 35 U.S.C. 154(b) by 0 days.

(21) Appl. No.: 16/677,808

(22) Filed: Nov. 8, 2019

(65) Prior Publication Data

US 2020/0071082 A1 Mar. 5, 2020

Related U.S. Application Data

(63) Continuation of application No. 16/166,218, filed on Oct. 22, 2018, now Pat. No. 10,507,978.

(60) Provisional application No. 62/578,409, filed on Oct. 28, 2017.

(51) Int. Cl.
*B65G 15/30* (2006.01)
*B65G 17/08* (2006.01)
*B65G 15/62* (2006.01)

(52) U.S. Cl.
CPC .............. *B65G 15/30* (2013.01); *B65G 15/62* (2013.01); *B65G 17/083* (2013.01); *B65G 17/086* (2013.01); *B65G 2812/02049* (2013.01); *B65G 2812/02217* (2013.01)

(58) Field of Classification Search
CPC ................... B65G 15/30; B65G 15/62; B65G 2812/02049; B65G 2812/02217

USPC .... 198/844.1, 850, 851, 852, 853; 59/83, 84
See application file for complete search history.

(56) References Cited

U.S. PATENT DOCUMENTS

| | | | |
|---|---|---|---|
| 2,091,213 A | 8/1937 | Pink |
| 2,264,810 A | 12/1941 | Robbins |
| 2,312,490 A | 3/1943 | Scherfel |
| 3,329,256 A | 7/1967 | Elgaway |
| 3,344,905 A | 10/1967 | Hofen |
| 3,526,207 A | 9/1970 | Nadelson |
| 3,920,117 A | 11/1975 | Roinestad |
| 4,078,655 A | 3/1978 | Roinestad |

(Continued)

FOREIGN PATENT DOCUMENTS

| DE | 69923306 | 4/2006 |
|---|---|---|
| EP | 0190808 | 8/1986 |

(Continued)

*Primary Examiner* — Gene O Crawford
*Assistant Examiner* — Lester Rushin, III
(74) *Attorney, Agent, or Firm* — Andrus Intellectual Property Law

(57) ABSTRACT

A mesh-like conveyor belt is capable of varying in width and shape as it travels. The conveyor belt comprises a plurality of links, joints, and control elements. The joints connect the links to each other and allow the links to change their orientation within the conveying surface of the conveyor belt. The plurality of links and joints allow the conveyor belt to vary in width, shape, trajectory, and surface speed while in motion. The conveyor belt also includes control elements, built into the structure of the belt that are capable of engaging with external guides. When the conveyor belt is in motion, the control elements engage with and follow the paths determined by external guides thereby controlling the shape of the belt.

20 Claims, 13 Drawing Sheets

(56) References Cited

U.S. PATENT DOCUMENTS

| | | | |
|---|---|---|---|
| 4,934,517 | A | 6/1990 | Lapeyre |
| 5,271,491 | A | 12/1993 | Irwin |
| 5,558,208 | A | 9/1996 | Kucharski |
| 5,906,270 | A | 5/1999 | Faulkner |
| 6,202,833 | B1 | 3/2001 | Greer |
| 7,222,731 | B2 | 5/2007 | Taylor et al. |
| 7,810,629 | B2 | 10/2010 | Kronseder et al. |
| 8,474,606 | B2 | 7/2013 | Meya et al. |
| 9,555,970 | B2 | 1/2017 | Franzoni et al. |

FOREIGN PATENT DOCUMENTS

| | | |
|---|---|---|
| EP | 0273213 | 7/1988 |
| EP | 3330203 | 6/2018 |
| WO | 2012008347 | 1/2012 |

RADIUS AND VARIABLE WIDTH CONVEYOR BELT

CROSS REFERENCE TO RELATED APPLICATIONS

This application is a continuation of pending U.S. patent application Ser. No. 16/166,218 filed Oct. 22, 2018, entitled "Radius and Variable Width Conveyor Belt" which claims priority to U.S. Provisional Application 62/578,409 entitled RADIUS AND VARIABLE WIDTH CONVEYOR BELT filed Oct. 28, 2017.

FIELD OF THE INVENTION

The present invention relates to conveyor belts for use in conveyors and other machines. More particularly, the present invention relates to conveyor belts containing a plurality of connected links which allow turning and variation of shape.

BACKGROUND OF THE INVENTION

Conveyor belts are used in many processing and handling applications for goods. Typical applications of conveyor belts include but are not limited to: transporting, changing elevation via inclines or declines, changing direction via turns, spreading, converging, diverting, combining, accumulating, positioning, orienting, and processing. Modular plastic belts, comprising brick-lay patterns of duplicate parts, are a common type of belting used in many applications. Modular plastic belts have several known and well understood shortcomings which place limitations on the design and types of conveyors that are able to be manufactured. One of these shortcomings is stress concentration when the conveyor belts are subject to turns. The links of modular plastic belts typically collapse on the inside radius of turns and separate from the load carrying connecting pins, which in turn, creates a stress concentration towards the outer radius. This stress concentration greatly reduces the overall load capacity of the belt. Therefore, conveyors having turns are limited to short lengths, minimal quantity of turns, and limited payload capacity. Production lines containing modular plastic belt conveyors with turns typically require a high cost due to the high quantity of drive mechanisms needed to run multiple conveyors. These production lines also contain frequent belt-to-belt transfer points which can sometimes cause product handling issues.

Another shortcoming of modular plastic belts is that they have a fixed width, meaning, the width along the entire length of a typical conveyor system cannot vary. When applications require spreading or converging product in-stream, the use of a fixed width belt often becomes problematic. In some cases, fixed or active rails systems are used above the conveyor belts to slide product transversely across the belt. These types of rails have been known to cause problems such as damage to delicate product, or difficulties with product handling due to the loss of velocity control that occurs as the product slips. In other cases, multiple strands of narrow straight belts are used at angles to each other in order to diverge or converge product. These systems inherently result in "dead" spaces between the belts which have been known to stall or damage product.

The present invention provides a solution to overcome many of the shortcomings of modular plastic belt and also creates new opportunities for system level designs. The present invention relates to a conveyor belt which can vary in overall width, shape, trajectory, and surface speed during travel. In addition, the present invention inherently and automatically distributes payload stresses throughout its entire structure, making high load capacities achievable in numerous applications, including turns.

SUMMARY OF THE INVENTION

The present invention relates to a conveyor belt that is capable of changing width, shape, trajectory, and surface speed during travel. The conveyor belt also automatically distributes loads to multiple joints during travel, making high load capacities achievable in various applications such as turns.

The conveyor belt comprises a plurality of interconnected sub-components of the following three types: links, joints, and control elements. The links comprise structural components or assemblies which are rotatably connected to each other via joints. The joints comprise features, components, or assemblies that enable said links to change their orientation in a manner that includes at least one axis of rotation normal or approximately normal to the conveying surface of said conveyor belt. The plurality of links and joints connected to each other form a mesh-like conveying surface which can vary in shape as it travels. The conveyor belt also includes integrated control elements, which are features or components designed to engage with external guides. The control elements are used to define and manipulate the width, shape, trajectory, and surface speed of the conveyor belt during travel.

Numerous embodiments exist for the conveyor belt in relation to its nominal constructed width, length, and thickness. Numerous embodiments also exist for the conveyor belt in relation to the design, location, and combination of its sub-components, which include said links, said joints, and said control elements.

The links included in the present invention may be made of rigid, semi-rigid, or flexible material. This is possible because the loads applied to the links during use are primarily tensile loads. Links may also be made up of single body parts, multiple body composite parts, or chains of multiple parts interconnected to each other.

The joints included in the present invention are features, components, or assemblies which connect the links to each other and allow them to rotate about an axis normal or approximately normal to the conveying surface of the conveyor belt. The joints may consist of interlocking features built into the bodies of the links or they may include one or more separate parts. The joints may also comprise components or assemblies having one or more independently located axes of rotation. One example of a single axis joint in a single location is a straight round pin inserted through holes at the ends of multiple adjacent flat links. One example of a multiple axis joint is a round ring connected to multiple links in such a manner that the link ends can both slide and pivot about the surface of the ring. One example of a joint including multiple independently located axes of rotation is a separate flat square part with holes in each of its four corners wherein each hole is rotatably connected to holes in the ends of adjacent links via round straight pins. Some other examples of joints provide infinite axes of rotation, such as a ball-in-socket joint, or a joint made of flexible material.

The control elements included in the present invention are features, components, or assemblies which are capable of engaging with external guides. The control elements may be configured to engage with outside surfaces of guides, the inside surfaces of guides, or both. Said control elements optionally include friction reducing elements such as slippery plastics, embedded lubricants, or rollers.

In another aspect of the invention, the invention is directed to a conveyor system comprising the inventive conveyer belt and one or more power sources and guides. Guides included in said conveyor system engage with the control elements of said conveyor belt for the purpose of defining or altering the width, shape, trajectory, or surface speed of said conveyor belt. Guides may be positioned at diverging angles to each other to create a spreading conveyor belt system, or guides may be positioned at converging angles to each other to create a narrowing conveyor belt system. Guides may also be formed into radii to create a turning conveyor belt system. There are many useful versions of the conveyor system comprising said conveyor belt including but not limited to the following: spreading conveyors, converging conveyors, turning conveyors, small radii turning conveyors, diverging turns, converging turns, trough conveyors, turning trough conveyors, spirals, inclines, declines, banked conveyors, twisted conveyors, and conveyors with internal motion or internal unique shapes.

The conveyor system also comprises one or more power systems to drive the belt and one or more tensioning systems to tension the belt. Some of the common drive arrangements which may be used include motor-driven shafts with sprockets or rollers engaging the surface of said conveyors belt. Some of the less common but equally effective methods to drive the conveyor belt include motor-driven shafts with belts, chains, or sprockets configured to engage one or more edges of said conveyor belt. Some of the common tensioning methods that may be used in conveyor systems include catenary sag, weighted rollers, or spring loaded rollers. A less common method that may also be used for tensioning includes spring loaded outer guides which apply tension to said conveyor belt by pulling in the transverse direction. Another less common method that may be used for tensioning, which applies to embodiments of the present invention that are flexible in the transverse direction, includes trough-shaped catenary sag.

For a better understanding of the present invention, reference is made to the following detailed description of various exemplary embodiments described in conjunction with the accompanying drawings. Upon reviewing the drawings, those skilled in the art should recognize that the components of the invention can take various forms, and that the invention can be implemented in a wide variety of embodiments. The embodiments described below are exemplary in nature and reference should be made to the claims when assessing the overall scope of the invention.

BRIEF DESCRIPTION OF THE DRAWINGS

FIGS. 14A-14C are detail views showing an example of a joint and link mechanism wherein said links comprise string, cord, wire, rope, or the like.

DETAILED DESCRIPTION

Figure 1:
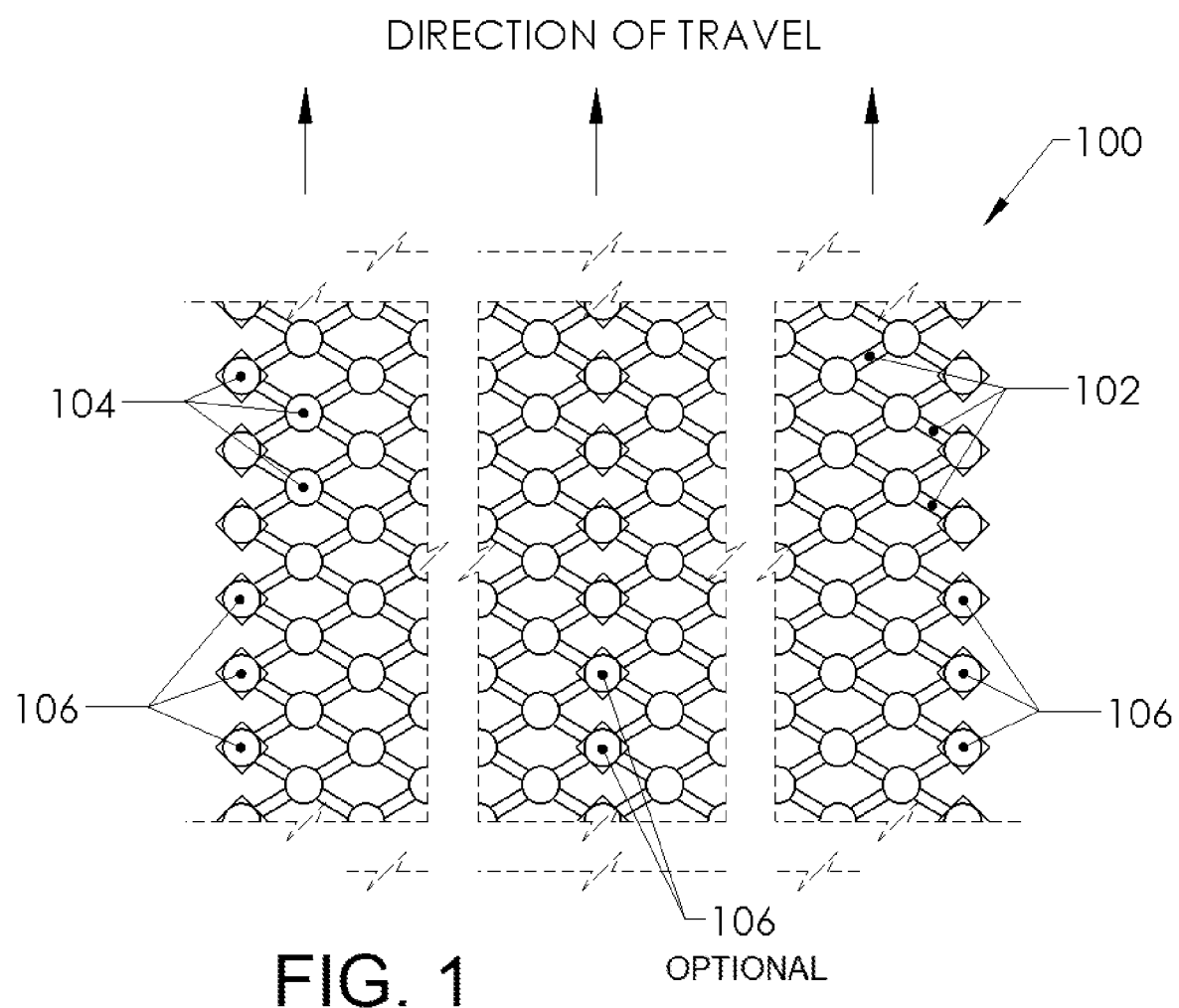
FIG. 1 is a symbolic representation of a conveyor belt constructed in accordance with the present invention.

The present invention relates to a conveyor belt which is able to vary in width, shape, trajectory, and surface speed during travel. FIG. 1 is a symbolic representation of a conveyor belt constructed in accordance with the present invention. This view shows a conveyor belt 100 comprising a plurality of links 102, joints 104, and control elements 106. The links 102 are structural members which are connected to each other via the joints 104. The control elements 106 are features or components capable of engaging with external guides. Said control elements are located in longitudinal arrangements at or near each edge of the conveyor belt and optionally in one or more locations within the span of the conveyor belt. As represented symbolically in FIG. 1, a plurality of links 102, joints 104, and control elements 106 are interconnected to form the conveyor belt 100. The links 102 are structural components or assemblies of components which are rotatably connected to each other via the joints 104. The joints 104 are features, components, or assemblies which rotatably connect the ends of the links to the ends of adjacent links and enable the links to change orientation within the conveying surface of the conveyor belt. This change in orientation is in a manner such that at least one axis of rotation is normal or approximately normal to the conveying surface of said conveyor belt. Due to the plurality of these interconnected rotatable links, the conveyor belt in its entirety is able to vary in overall width, shape, trajectory, and surface speed. Integrated or connected to the links 102 or the joints 104 are the control elements 106, which are features, components, or assemblies capable of engaging with external guides. The control elements 106 are preferably located in longitudinal arrays, with each array parallel to the direction of travel of the conveyor belt 100. Arrays of control elements 106 are positioned at or near each edge of the conveyor belt 100 and optionally may be positioned in one or more locations within the span of the conveyor belt 100. The control elements 106 perform the function of guiding and shaping the conveyor belt as it moves through the system which it is a part of.

Reference is made in the following paragraphs to various embodiments of the invention and its sub-components. The present invention relates to the conveyor belt assembly 100 in which pluralities of links 102, joints 104, and control elements 106. are assembled together in various combinations. FIGS. 2 through 7 show various embodiments for the purpose of explaining the general concepts and uses of the present invention. FIGS. 8 through 20 show example embodiments of the sub-components of the conveyor belt 100 and rails used in an overall conveying system.

Figure 2:
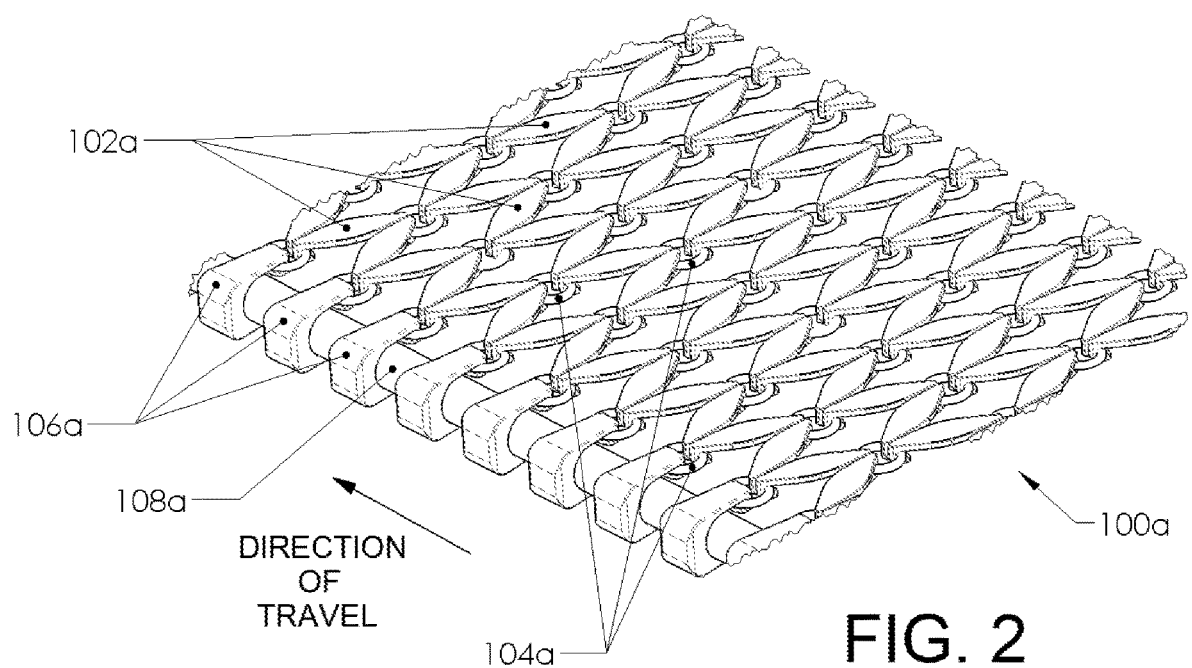
FIG. 2 is a partial view of a conveyor belt constructed in accordance with an exemplary embodiment of the invention, shown in motion while simultaneously engaged on an external guide.

One example of a conveyer system constructed in accordance with the present invention is shown in FIG. 2. The conveyor belt 100a includes a plurality of links 102a. The links 102a are rigid members with flat tops and hooked ends rotatably connected to each other via joints 104a comprising rigid round rings. The joints 104a enable the links 102a to change orientation within the conveying surface due to the fact that the links are free to rotate about the joints via sliding motion between their hooked ends and the surface of the rings. Additionally, the joints 104a in this embodiment which are residing at the edge of the conveyor belt are connected to control elements 106a comprising rigid hook-shaped components 106a. Said control elements 106a are capable of engaging with an external round guide 108a thereby controlling the location of the edge of the conveyor belt 100a.

Figure 3:
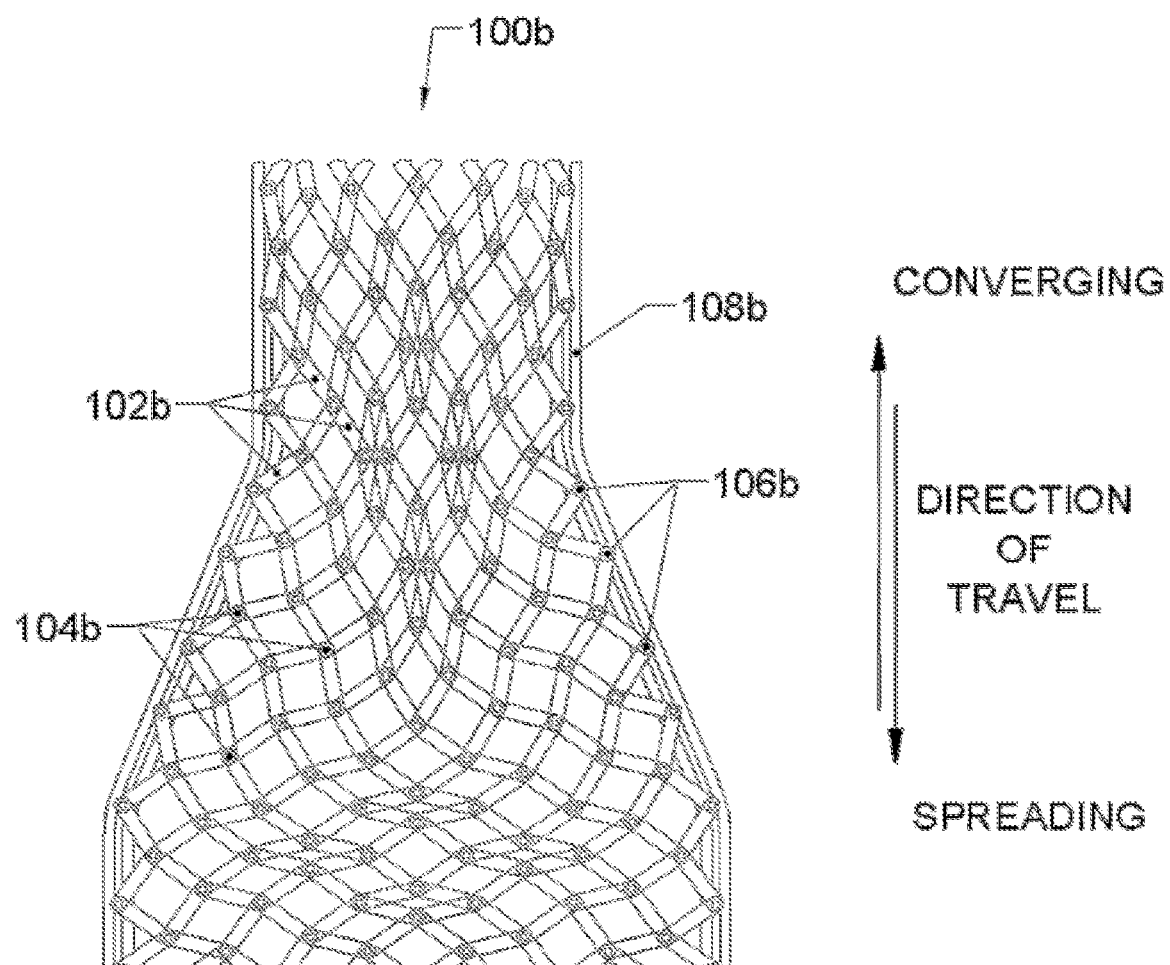
FIG. 3 is a top view of a conveyor belt constructed in accordance with another exemplary embodiment of the invention, shown moving through a converging or spreading apparatus.

FIG. 3 shows another embodiment of the present invention wherein a plurality of short straight bars with holes at each end form the links 102b. Pins are inserted through the holes to form the joints 104b. The joints include one axis of rotation normal to the conveying surface of the conveyor belt 100b which enables the links to change their orientation within the conveying surface. Joints 104b located at the edge of the conveyor belt in this embodiment include extended pins which make up the conveyor belt's control elements 106b. The control elements engage an external guide 108b to control the conveyor belt's overall direction and shape. As shown in FIG. 3, the plurality of links, joints, and control elements 106b allow the conveyor belt 100b in its entirety to vary in width as it travels. The embodiment in FIG. 3 shows the conveyor belt 100b converging when its direction of travel is upward, and spreading when its direction of travel is downward. Converging and spreading are important and useful characteristics of the present invention.

Figure 4:
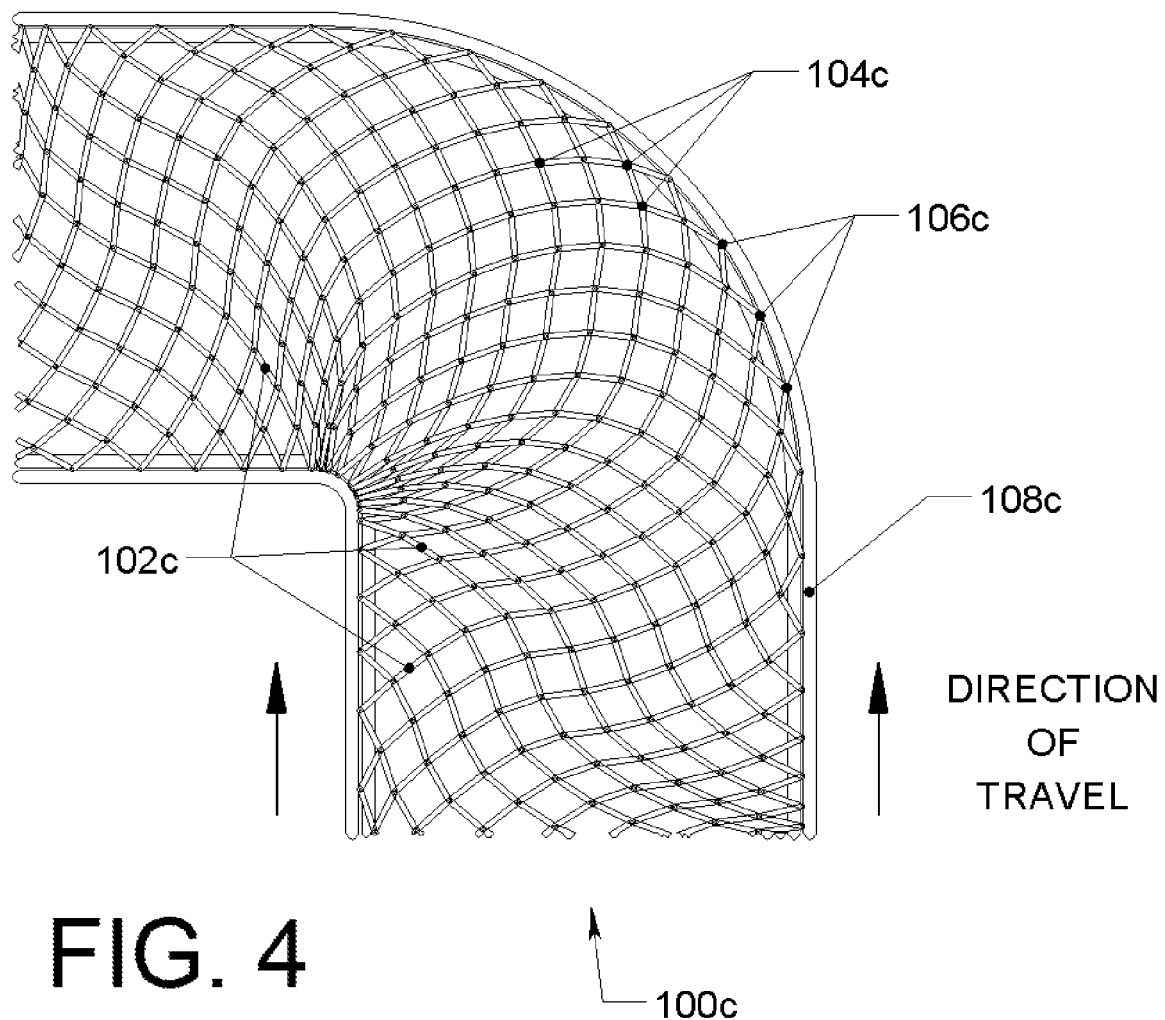
FIG. 4 is a top view of a conveyor belt constructed in accordance with another exemplary embodiment of the invention, shown moving through turn.

Another similar embodiment of the present invention is shown in FIG. 4. In this embodiment, slightly longer and narrower straight rigid bars form the links 102c, smaller diameter pins form the joints 104c, and extended pins located at the edges of the conveyor belt form the control elements 106c. In FIG. 4, the conveyor belt 100c is traveling through a turn with a small inside radius. The shape of this turn is dictated by external fixed guides 108c, which are engaging the conveyor belt's control elements 106c as it travels. The combination of links 102c, joints 104c, and control elements 106c enable the characteristic of turning, and in particular relatively tight turning compared to traditional conveyor belts.

Figure 5:
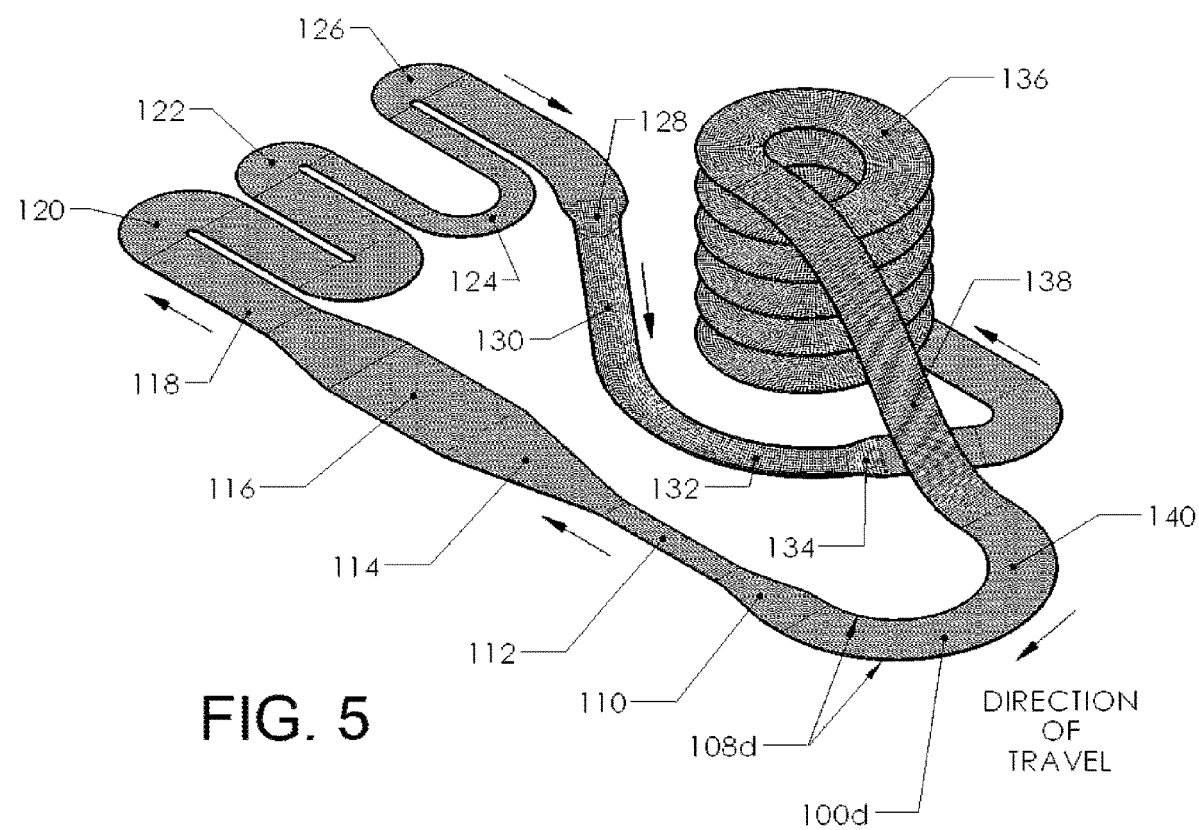
FIG. 5 is a system level view showing various example capabilities of a conveyor belt constructed in accordance with the present invention.

Converging, spreading, and turning are a few of the useful characteristics of the present invention. As shown in FIG. 5, there are additionally many other useful characteristics. The system level view in this figure is showing an embodiment of the conveyor belt 100d being guided at its edges by guide rails 108d. External structure is omitted from this image for the sake of illustration. The external structure would typically include slide beds or runners supporting the span of the belt, framework, legs, tensioning systems, and drive systems. FIG. 5 illustrates the following useful characteristics of the present invention: The ability to converge or become narrower while simultaneously increasing in surface speed 110; The ability to travel in a narrow high surface speed configuration 112; The ability to spread or become wider while simultaneously decreasing in surface speed 114; The ability to travel in a wide low surface speed configuration 116; The ability to travel in a medium width, medium surface speed configuration 118; The ability to travel around a tight radius turn 120; The ability to travel around a converging turn 122; The ability to travel around a large radius turn while in a narrow high speed configuration 124; The ability to travel around a spreading turn 126; The ability to travel through a flat to trough transition 128; The ability to travel in a straight troughed shape, wherein the conveyor belt has a lateral drooping curve 130; The ability to travel in a troughed shape while simultaneously turning 132; The ability to travel through a trough to flat transition 134; The ability to change in elevation while simultaneously turning or moving through a spiral 136; The ability to change in elevation while moving straight 138; The ability to travel through a large radius turn while running in a medium or wide width configuration 140. In addition to the large variety of characteristics which can be achieved while guiding the conveyor belt 110d at its edges, control elements may also be utilized inside the span of the conveyor belt to enable other specialized functionalities. Some of these other specialized functionalities include but are not limited to: internal back-and-forth motion, internal shaking, inverse trough shapes wherein the conveyor belt maintains a convex or upward lateral curve, bumps or high sections within the conveyor belt, depressions or low sections within the belt, and banked or twisting sections within the conveyor belt.

Figure 6:
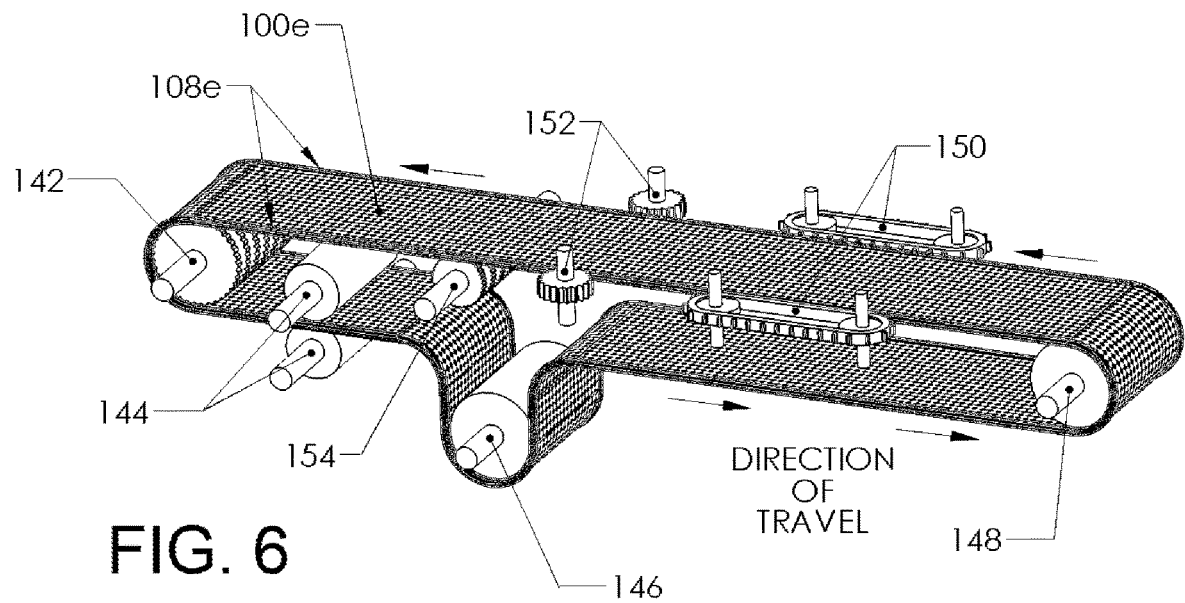
FIG. 6 is a system level view showing various example methods of driving or powering a conveyor belt constructed in accordance with the present invention.

Embodiments of the present invention typically will be driven or put into motion by an external power source. Power sources such as AC motors, DC motors, servo motors, and the like are a few exemplary methods of driving said conveyor belt. Alternative methods can also be employed such as air cylinders to create oscillating motion of the conveyor belt, or pulling of sections of belt back and forth using motor-driven cables, gravity powered systems, or hand cranks. As shown in FIG. 6, a conveyor belt embodiment 100e which is guided by rails at its edges 108e can be engaged to be driven in a variety of exemplary methods including but not limited to the following: A drive shaft with sprockets 142; Pinch rollers which squeeze the belt and use friction to provide pulling force 144; A drum drive which uses belt tension and friction to provide pulling force 146, 148; Chains with lugs which engage the edges of the conveyor belt to provide pulling force 150; Sprockets which engage the edges of the conveyor belt to provide pulling force 152; A shaft with sprockets located tangential to the conveyor belt 154. In some applications, for example when conveyor belts are very long, multiple power systems can be employed to drive a single belt. These power systems may be installed at intervals to reduce belt tension and provide the required driving power. Multiple drive arrangements may use friction rollers so as to avoid accumulated stretching or bunching of the conveyor belt over time, or, methods such as controlled servo motors with or without feedback loops may be employed so that sprocket engaging drive systems can be used at distances from each other while maintaining required speeds to match the speed of the belt.

Figure 7:
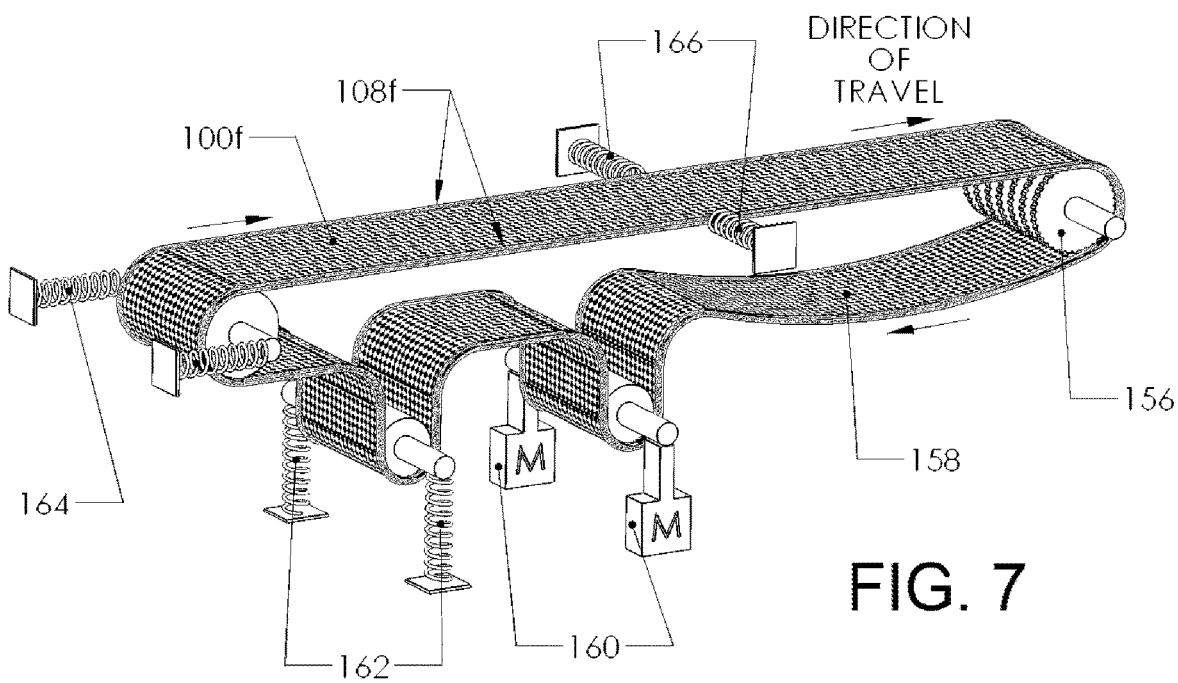
FIG. 7 is a system level view showing various example methods of tensioning a conveyor belt constructed in accordance with the present invention.

Embodiments of the present invention, when used in conveying applications, may require at least one tensioning mechanism to stay properly connected to guides and drive mechanisms while in motion. As shown in FIG. 7, a conveyor belt embodiment 100f, which is guided by rails at its edges 108f, and driven by a powered shaft with sprockets 156 may be tensioned in a variety of methods including but not limited to the following: Catenary sag 158, which is a hanging section of belt that uses the conveyor belt's own weight to apply and maintain proper running tension; Weighted tensioning rollers 160; Spring loaded tensioning rollers 162, 164; Or spring loaded guide rails 166, which apply tension by pulling on the conveyor belt in the transverse direction.

As mentioned earlier, numerous embodiments exist for the sub-components of the present invention, with those sub-components being defined as the links 102, joints 104, and control elements 106. Embodiments of the present invention may be created by assembling pluralities of either identical or non-identical embodiments of each of the aforementioned sub-components. In addition, embodiments of the present invention and its sub-components may be made from various materials and may be made to various dimensions, sizes, scale, length, width, or thickness. The following paragraphs describe various example embodiments of the sub-components of the conveyor belt and guide rails.

Figure 8A:
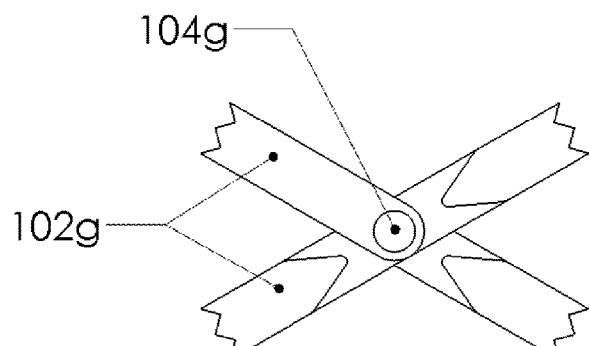
FIGS. 8A-8C are detail views showing an example of a joint and link mechanism wherein said links share a common single axis of rotation at their ends.
Figure 8C:
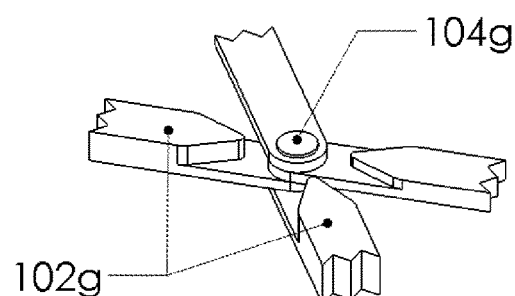
Figure 8B:
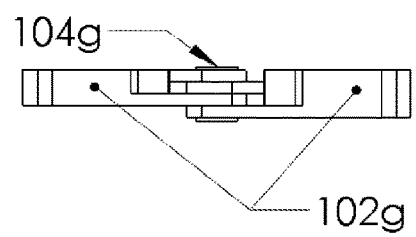

FIGS. 8A-8C show—an example embodiment of a joint and link sub-assembly. The links 102g are rigid members with holes at their ends rotatably connected to each other via the joints 104g comprising pins. This embodiment illustrates an example joint having only one axis of rotation which is normal to the conveying surface of the conveyor belt. The links 102g in this example also include bosses of varying height for the purpose of creating a flush conveying surface on the top side. This example illustrates that the link sub-components can be non-identical and still be assembled to each other to form the conveyor belt.

Figure 9A:
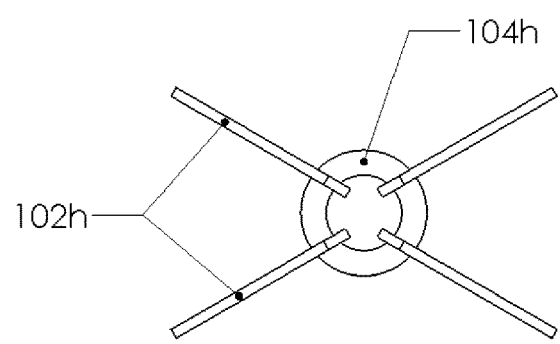
FIGS. 9A-9C are detail views showing an example of a joint and link mechanism wherein said joints enable multiple axes of rotation. Said links 102h in this embodiment can both slide and pivot about the joint 104h.
Figure 9C:
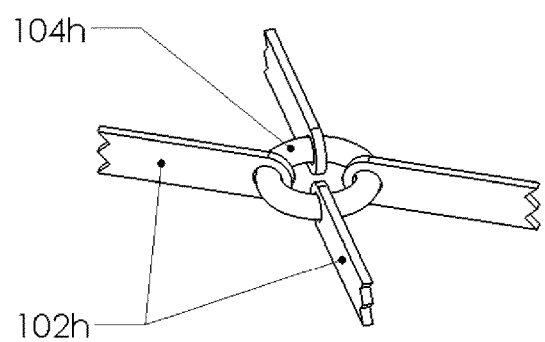
Figure 9B:
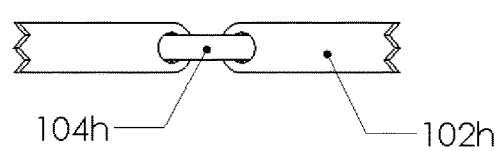

FIGS. 9A-9c show another example embodiment of a joint and link sub-assembly. In this embodiment, the links 102h comprise rigid flat bars which are positioned on their edge and include holes at their ends. Inserted through these holes are the joints 104h, which are made up of formed and welded rings. This embodiment illustrates an example where identical links and joints are assembled to create the conveyor belt. This embodiment also illustrates an example joint having multiple modes of rotation. The first mode of rotation is through sliding motion between the ends of the links and the surface of the ring wherein the links are enabled to change their orientation within the surface of the conveyor belt. The second mode of rotation is through pivoting motion of the ends of the links on the surface of the ring wherein the conveyor belt is enabled to flex in both transverse and longitudinal directions. A conveyor belt made of up the links 102h and said joints 104h will have additional useful characteristics beyond variable width and turning capabilities. Those characteristics include the ability to form a trough shape, the ability to bend in the longitudinal direction, the ability to twist, the ability to have high or low sections within the span of the conveyor belt, among many others.

Figure 10A:
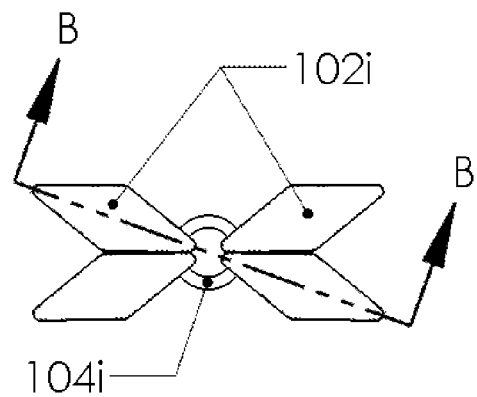
FIGS. 10A-10C are detail views showing an example of a joint and link mechanism wherein said links 102i snap onto said joints 104i via hook like features 168.
Figure 10C:
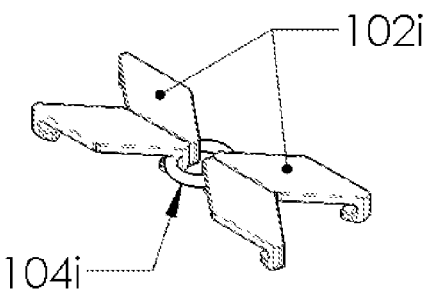
Figure 10B:
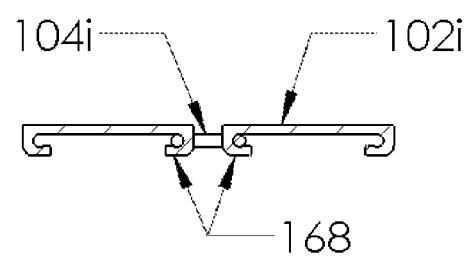

FIGS. 10a-10C show another example embodiment of a joint and link sub-assembly. In this embodiment, the links 102i comprise rigid diamond shaped members with hooks 168 at their ends. The links are rotatably connected to each other via the joints 104i which comprise rigid round rings. The hooks attach to the rings and enable multiple modes of rotation between said links. Those modes of rotation are similar to the modes previously described by the embodiment in FIGS. 9A-9C. A conveyor belt made up of the links 102i and the joints 104i also exhibits similar useful characteristics to the embodiment in FIGS. 9A-9C. The embodiment shown in FIGS. 10A-10C has additional useful features due to its shape. The hook features 168 enable both ease of assembly and ease of maintenance for the conveyor belt. This is due to the fact that links can be simply "snapped" into place by pulling the hook features onto the rings. This embodiment is very clean, which is useful in sanitary applications, due to the fact that there are no trapped or enclosed pockets and all surfaces are easily accessible for washing down. Additionally, the diamond shaped links increase the amount of surface area on the top of the conveyor belt and simultaneously decrease the size of the openings. Small openings are useful when safety is a concern because they prevent pinch and shear points from occurring. A slight variation of this embodiment which would further reduce the size of openings includes links with alternating protruding "comb-like" features at their edges; these protruding features would slide past each other on adjacent links without touching, but at the same time interlacing, so that gap sizes are minimized.

Figure 11A:
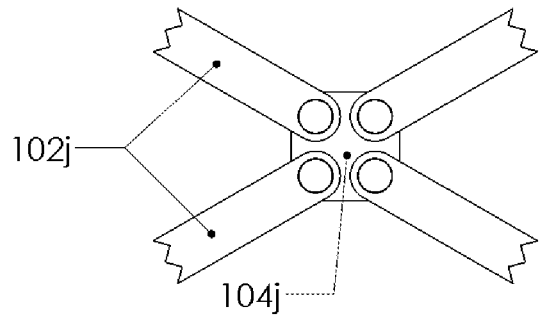
FIGS. 11A-11C are detail views showing an example of a joint and link mechanism wherein said joint 104j includes a component having multiple connections 170 to the links 102j.
Figure 11C:
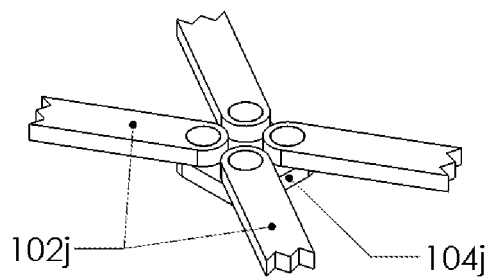
Figure 11B:
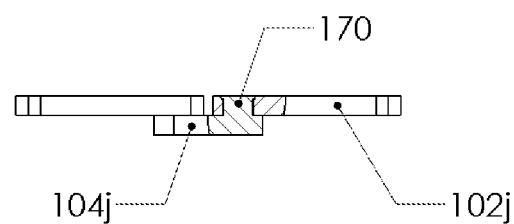

FIGS. 11A-11C show another example embodiment of a joint and link sub-assembly. In this embodiment, the links 102j comprise straight rigid members with holes at their ends, and the joints 104j comprise square shaped parts with protruding pin-shaped features 170 located at each corner. The links snap onto the pin features to enable rotation of the links within the surface of the conveyor belt. This example sub-assembly illustrates that joint embodiments may include multiple connections to links and multiple axes of rotation with each connection located in an independent location.

Figure 12A:
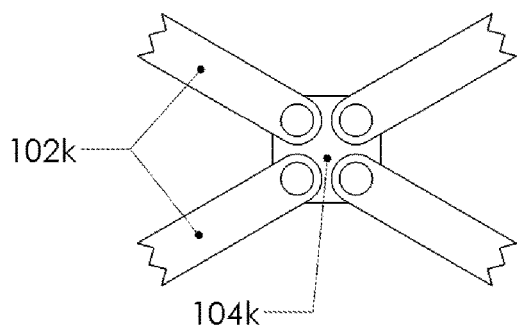
FIGS. 12A-12C are detail views showing an example of a joint and link mechanism wherein said joint 104k is a component having multiple connections 172 to said links 102k, each connection residing in an independent location, and each connections 172 having infinite axes of rotation.
Figure 12C:
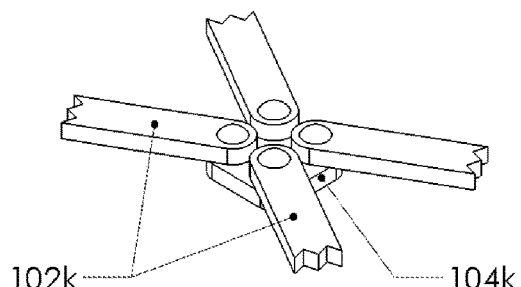
Figure 12B:
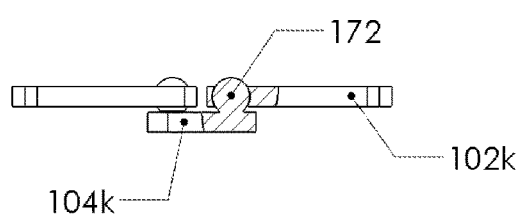

FIGS. 12A-12C show another example embodiment of a joint and link sub-assembly. In this embodiment, the links 102k comprise straight rigid members with spherical shaped holes at their ends, and the joints 104k comprise square shaped parts with protruding ball-like features 172 located at each corner. This example sub-assembly is similar to that described by FIGS. 11A-11C, except that the joints shown include infinite axes of rotation for each connection to each link. A conveyor belt built with said links 102k, and said joints 104k is able to flex in multiple directions and exhibits similar useful characteristics as previously described by the embodiments in FIGS. 9A-9C and 10A-10C.

Figure 13A:
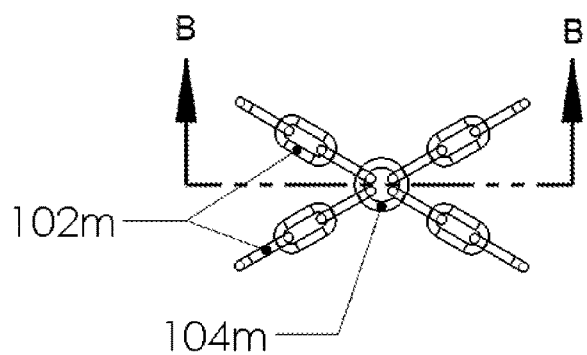
FIGS. 13A-13C are detail views showing an example of a joint and link mechanism wherein said links comprise interconnected chain.
Figure 13C:
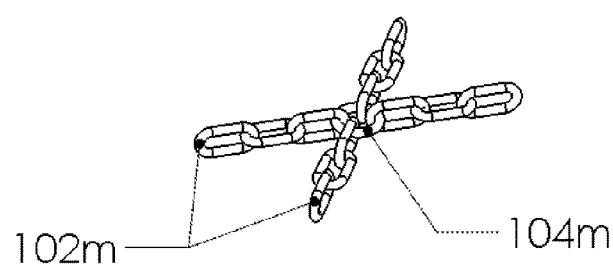
Figure 13B:
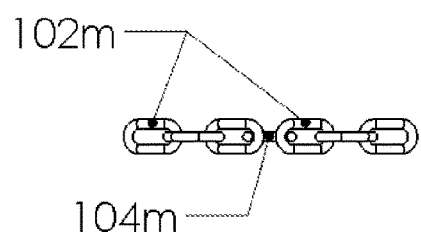

FIGS. 13A-13C show another example embodiment of a joint and link sub-assembly. In this embodiment, the links 102m comprise short sections of chain, and the joints 104m comprise round rings. The links are connected to each other via the rings and thereby similar modes of rotation are enabled between links as in the other previously described embodiments containing rings as joints. This example has even more flexibility compared to previously described embodiments due the fact that the links themselves contain their own internal degrees of freedom. This embodiment illustrates that the links may exist as multiple interconnected parts while still functioning as needed for the variable width conveyor belt.

Figure 14A:
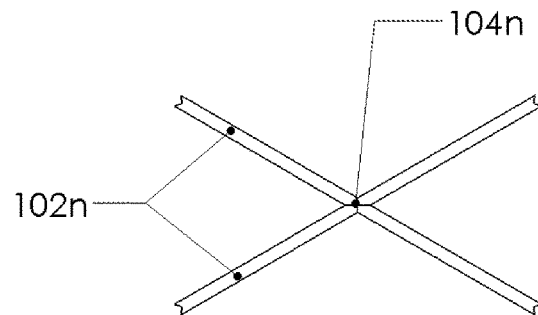
Figure 14C:
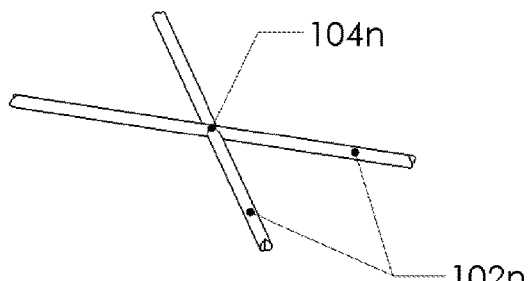
Figure 14B:
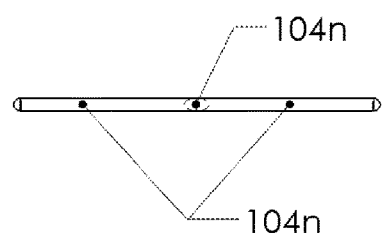

FIGS. 14A-14C show another example embodiment of a joint and link sub-assembly. In this embodiment, the links 102m comprise short sections of cord, wire, string, rope, or the like, and the joints 104m comprise knots or bonds between said links. The links in this embodiment are enabled to change their orientation within the surface of the conveyor belt due to the flexing of material at the joint. This embodiment of link and joint sub-components has a high degree of flexibility in all directions which can be useful if small diameter nose bars are required at the end transfer points of a conveyor system.

Figure 15A:
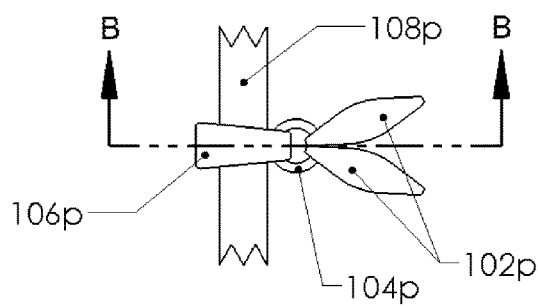
FIGS. 15A-15C are detail views showing an example of a control element 106p located at the edge of a conveyor belt and engaging a round bar guide 108p.
Figure 15C:
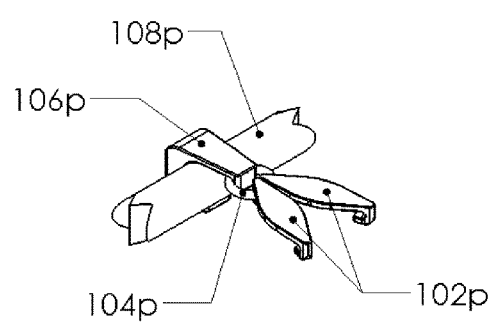
Figure 15B:
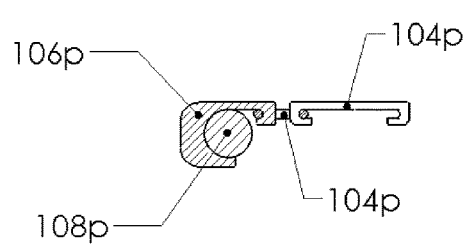

FIGS. 15A-15C show an example embodiment of a control element 106p attached to the edge of a conveyor belt. In this embodiment, the links 102p comprise rigid oval shaped members with hooked ends, and the joints 104p comprise rigid rings. This embodiment is a section of the conveyor belt illustrated in FIG. 2. Said control element 106p is a rigid member with a small hook on one end and a large hook on the other. The small hook engages the ring joint to create a rotatable connection, while the large hook engages a round guide rail 108p to create a slidable connection. This embodiment is an example control element that is located on the edge of a conveyor belt and which engages the outside of an external guide. This example control element also provides a few advantageous characteristics to the conveyor belt design, including, ease of assembly, ease of maintenance, low cost, and sanitary construction.

Figure 16A:
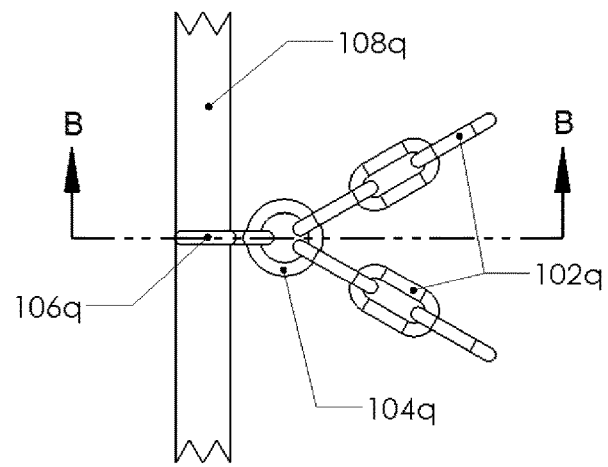
FIGS. 16A-16C are detail views showing an example of a control element 106q located on the edge of a conveyor belt and engaging a round bar guide 108q.
Figure 16C:
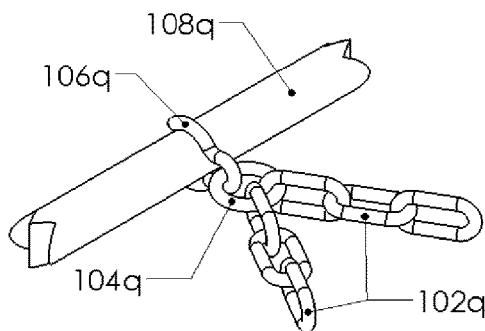
Figure 16B:
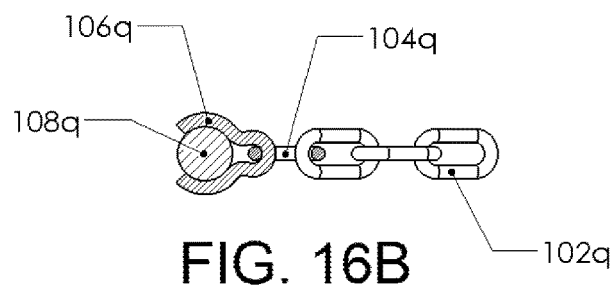

FIGS. 16A-16C show another example embodiment of a control element 106q attached to the edge of a conveyor belt. In this embodiment, the links 102q comprise interconnected chain, and the joints 104p comprise rigid rings. The links and joints in this embodiment are similar to that which is shown in FIGS. 13A-13C. The control element 106q comprises an open u-shaped bent metal rod which is rotatably attached to the ring joint 104q and which slidably engages the outside surface of a round guide rail 108q. This embodiment is another example of a control element located at the edge of a conveyor belt.

Figure 17A:
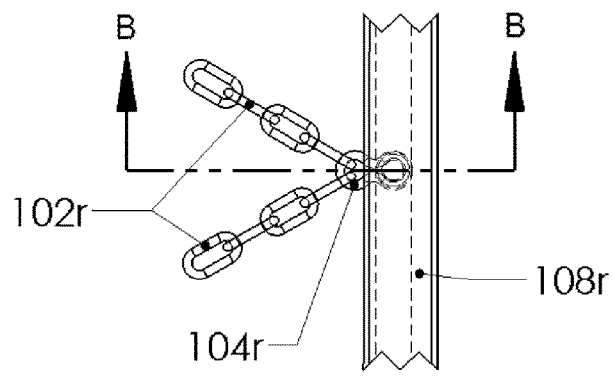
FIGS. 17A-17C are detail views showing an example of a control element 106r located on the edge of a conveyor belt and engaging a c-shaped guide.
Figure 17C:
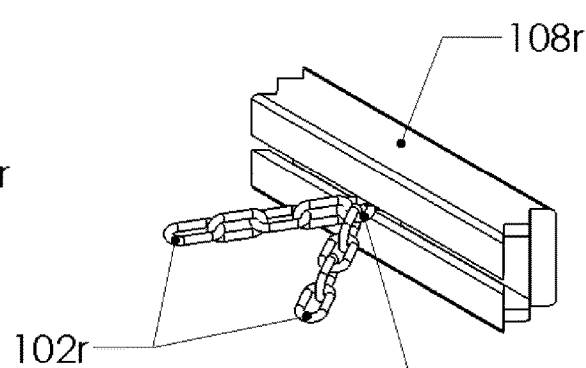
Figure 17B:
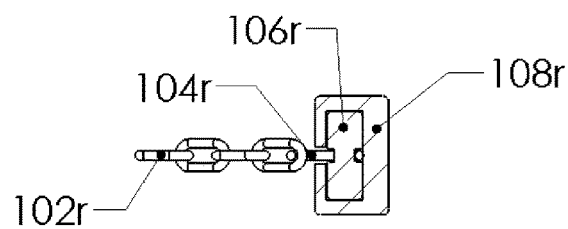

FIGS. 17A-17C show another example embodiment of a control element 106r attached to the edge of a conveyor belt. In this embodiment, the links 102r comprise interconnected chain, and the joint 104r comprises a rigid bent member shaped like the number eight. The control element 106r comprises a round notched member connected to the joint at its center. The control element 106r also slides and rolls inside an external c-shaped guide 108r. This embodiment is an example of a control element located at the edge of a conveyor belt which engages with the inside surface of an external guide. Some advantages of this example embodiment are high strength, reduced friction due to rolling motion, and the fact that the outer fixed guide 108r acts as a safety guard at the edge of the moving conveyor belt.

Figure 18A:
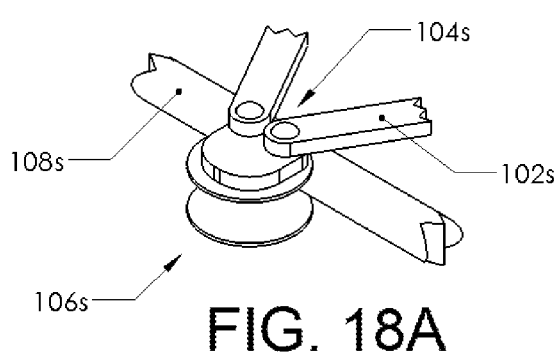
FIGS. 18A-18D are detail views showing an example of a control element 106s comprising a roller and shaft which is located on the edge of a conveyor belt and engaging with a round bar guide rail 108s.
Figure 18C:
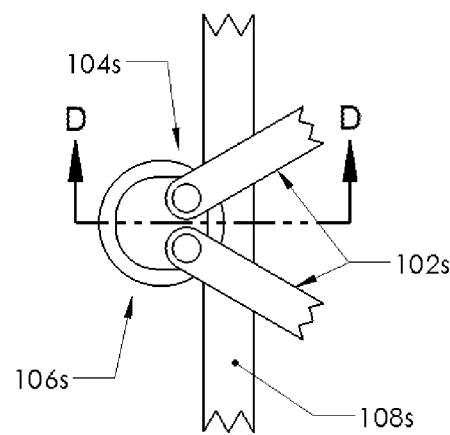
Figure 18B:
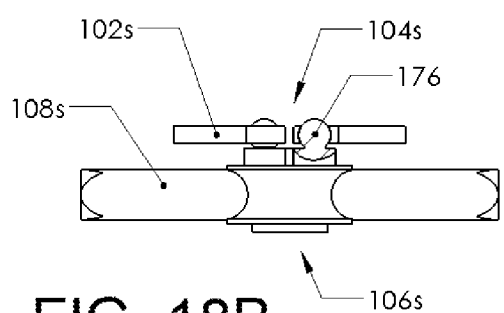
Figure 18D:
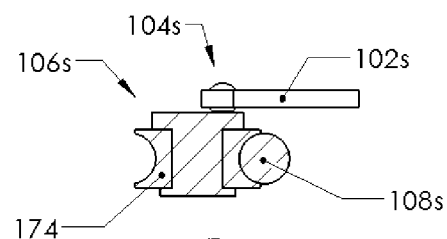

FIGS. 18A-18C show another example embodiment of a control element 106s attached to the edge of a conveyor belt. In this embodiment, the links 102s comprise rigid flat members with spherical shaped holes at their ends, and the joints 104s comprise rigid members including two ball-in-socket connections 176 to said links. The control element 106s comprises a shaft-like feature protruding from the same body that makes up the joint with a grooved roller 174 located on and free to spin on this shaft. The control element 106s engages the outside surface of a round guide 108s via rolling motion of its included roller 174. This example embodiment of a control element illustrates that rollers may optionally be included to reduce friction when engaged with a guide.

Figure 19A:
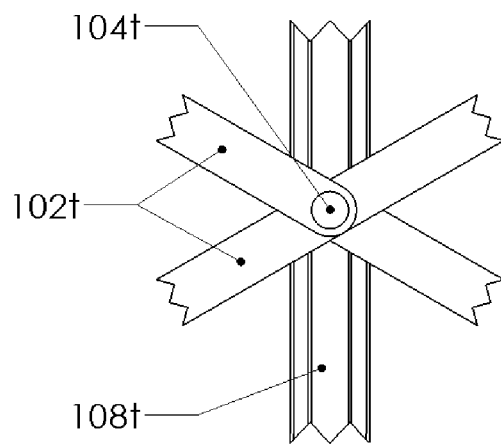
FIGS. 19A-19C are detail views showing an example of a control element 106t located within the span of a conveyor belt and engaging with a u-slot guide 108t.
Figure 19C:
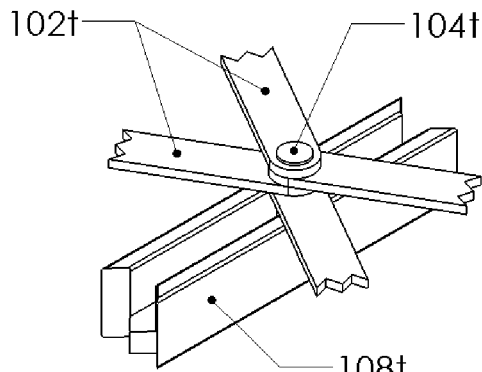
Figure 19B:
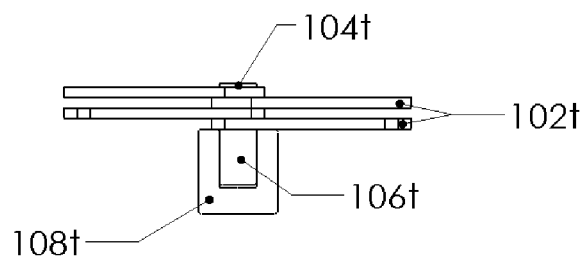

FIGS. 19A-19C show an example embodiment of a control element 106t included inside the span of a conveyor belt. In this embodiment, the links 102t comprise rigid flat members with holes at their ends, and the joints 104t comprise rigid straight pins inserted through said holes. An extension of this pin in the downward direction forms the control element 106t. Said control element engages with a u-shaped guide 108t located underneath the conveyor belt. This example embodiment illustrates that control elements may optionally exist within the span of a conveyor belt. This type of control element may be used to create characteristics relating to internal motion of a conveyor belt, such as back-and-forth shaking.

Figure 20A:
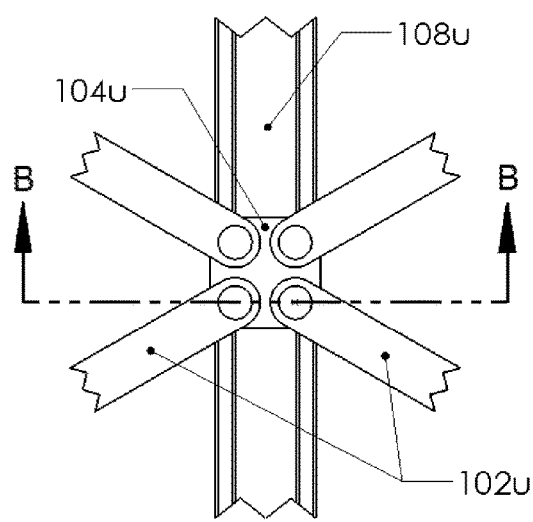
FIGS. 20A-20C are detail views showing an example of a control element 106t located within the span of a conveyor belt and engaging with a u-slot guide 108t.
Figure 20C:
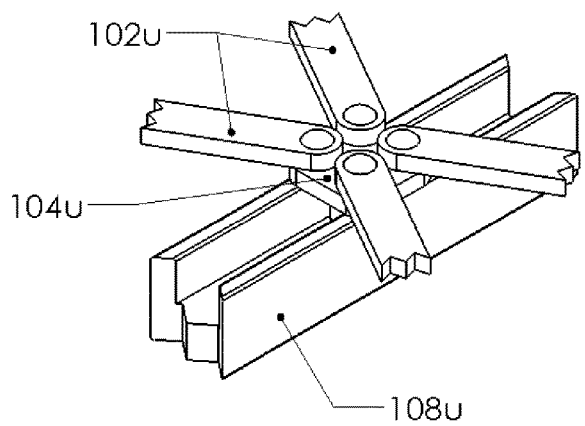
Figure 20B:
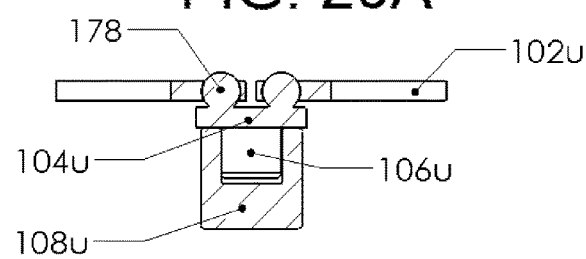

FIGS. 20A-20C show another example embodiment of a control element 106u included inside the span of a conveyor belt. In this embodiment, the links 102u comprise rigid flat members with spherical holes at their ends, and the joints 104u comprise square shaped parts with ball-in-socket features 178 located at each corner. The control element 106u comprises a cylindrical protrusion extending downward from the joint 104u. The control element 106u engages with a u-shaped guide 108u located underneath the conveyor belt. This example is similar to the embodiment shown in FIGS. 19A-19C in that it illustrates that control elements may optionally exist within the span of a conveyor belt. This example provides additional useful characteristics to the conveyor belt including a flush upper conveying surface, due to said joint having connections to said links in independent locations, and, a more flexible conveyor belt in both transverse and longitudinal directions, due to the ball-in-socket joints.

Numerous other embodiments also exist for the sub-components not shown in the previously described images. For example, links can be made up of rigid wire with bent hook or loop shaped features at their ends, which are connected to each other via joints comprising pins, rings, or by direct connection of the link ends. Links can also be made up of long string or cord which is threaded through multiple joints and knotted, bonded, or crimped at various locations to form the joints. Links can be made of rigid straight members which are connected to each other via flexible bonds to form the joints. Also, links can be made of members varying in length, for example long links located near the edges of a conveyor belt combined with short lengths located near the middle, the purpose of this variation being that the conveyor belt can achieve different characteristics such as reduced radius turns. Links can comprise specially shaped members which interlace with each other during orientation changes for the purpose of reducing opening sizes in the conveyor belt. Joints can comprise separate parts which include internal additional modes of rotation such as a hinge joint between connections to the links. Joints can include extended platforms which protrude higher than the surface of the links for the purpose of creating a conveyor belt which uses the tops of joints as the conveying surface. Control elements can contain ball bearings, wear pads made of slippery materials, or materials with embedded solid lubricants for the purpose of friction reduction.

Although the invention has been described in detail with reference to certain preferred embodiments, other embodiments are possible. Therefore, the spirit and scope of the appended claims should not be limited to the description of the exemplary embodiments contained herein.

What is claimed is:

1. A conveyor belt comprising:
a mesh conveying surface capable of varying in width when in motion along a direction of travel, said mesh conveying surface being formed by a plurality of links and joints extending across and connected to each other across the mesh conveying surface, wherein the joints rotatably connect the ends of the links to the ends of adjacent links and enable the links to change orientation in a manner that includes at least one axis of rotation normal or approximately normal to the conveying surface rendering the mesh conveying surface flexible in both a direction transverse and a direction parallel with the direction of travel; and
control elements capable of engaging with external guides to guide the conveyer belt as it is driven to move along the direction of travel.

2. The conveyor belt in claim 1 wherein said links comprise single-body parts made of rigid or semi-rigid material.

3. The conveyor belt in claim 1 wherein said links comprise multiple body composite parts.

4. The conveyor belt in claim 1 wherein said links comprise flexible material.

5. The conveyor belt in claim 1 wherein said links comprise a chain of interconnected parts each made of rigid or semi-rigid material.

6. The conveyor belt in claim 1 wherein said joints comprise interlocking features which are included in the bodies of said links.

7. The conveyor belt in claim 1 wherein said joints include multiple connections to said links wherein each connection resides along a common axis.

8. The conveyor belt in claim 1 wherein said joints include multiple connections to said links wherein each connection resides in an independent location.

9. The conveyor belt in claim 1 wherein said joints comprise bonds between ends of said links.

10. The conveyor belt in claim 1 wherein said joints comprise rings or hoops.

11. The conveyor belt in claim 1 wherein said joints comprise a ball in a socket.

12. The conveyor belt in claim 1 wherein said control elements are configured to engage with the outside surface of external guides.

13. The conveyor belt in claim 1 wherein said control elements are configured to engage with the inside surface of external guides.

14. The conveyor belt in claim 1 wherein said control elements include friction reducing parts such as wear pads or rolling parts.

15. A conveyor system comprising the conveyor belt of claim 1, at least one power source, and guides, wherein the guides define the width, shape, trajectory, and surface speed of said conveyor belt, and wherein said power source moves the conveyor belt.

16. The conveyor system in claim 15 wherein said conveyor belt increases in width while in motion via said guides positioned at diverging angles to each other.

17. The conveyor system in claim 15 wherein said conveyor belt decreases in width while in motion via said guides positioned at converging angles to each other.

18. The conveyor system in claim 15 wherein said conveyor belt moves through a turn while in motion via said guides positioned to form a curve.

19. The conveyor system in claim 15 wherein said conveyor belt is driven to move via said power source applied at one or both edges of said conveyor belt.

20. The conveyor system in claim 15 wherein tension force is applied to said conveyor belt in a transverse or approximately transverse direction at one or both edges of the conveyor belt.

* * * * *